US007617070B2

(12) United States Patent
Kurth et al.

(10) Patent No.: US 7,617,070 B2
(45) Date of Patent: Nov. 10, 2009

(54) ABSOLUTE POSITION DETERMINATION OF AN OBJECT USING PATTERN RECOGNITION

(75) Inventors: Antony J. Kurth, Bradenton, FL (US); Karl H. Becker, Riverview, FL (US)

(73) Assignee: Honeywell International Inc., Morristown, NJ (US)

( * ) Notice: Subject to any disclaimer, the term of this patent is extended or adjusted under 35 U.S.C. 154(b) by 116 days.

(21) Appl. No.: 11/938,595

(22) Filed: Nov. 12, 2007

(65) Prior Publication Data

US 2008/0118154 A1    May 22, 2008

Related U.S. Application Data

(63) Continuation-in-part of application No. 11/004,759, filed on Dec. 3, 2004, now Pat. No. 7,295,947.

(60) Provisional application No. 60/608,819, filed on Sep. 10, 2004.

(51) Int. Cl.
    *G01C 9/00*    (2006.01)
(52) U.S. Cl. ...................... 702/150; 702/151
(58) Field of Classification Search ............... 702/150, 702/151; 73/1.75, 177, 1.78; 356/139.01, 356/138, 139.03, 139.1
    See application file for complete search history.

(56) References Cited

U.S. PATENT DOCUMENTS

| 3,039,316 | A | 6/1962  | Slater          |
| 3,056,303 | A | 10/1962 | Naylor          |
| 3,365,942 | A | 1/1968  | Blazek          |
| 3,439,546 | A | 4/1969  | Baker et al.    |
| 3,576,124 | A | 4/1971  | O'Connor        |
| 3,670,585 | A | 6/1972  | Alexander et al.|
| 3,769,710 | A | 11/1973 | Reister         |
| 3,782,167 | A | 1/1974  | Stuelpnagel     |
| 4,003,265 | A | 1/1977  | Craig et al.    |
| 4,150,579 | A | 4/1979  | Vaughn          |
| 4,244,215 | A | 1/1981  | Frosch et al.   |
| 4,515,486 | A | 5/1985  | Ide             |

(Continued)

FOREIGN PATENT DOCUMENTS

GB    866473    4/1961

(Continued)

OTHER PUBLICATIONS

European Patent Office, "European Search Report", Mar. 5, 2009, Published in: EP.

(Continued)

*Primary Examiner*—Drew A Dunn
*Assistant Examiner*—Stephen J Cherry
(74) *Attorney, Agent, or Firm*—Fogg & Powers LLC (57) ABSTRACT

A position determining system that includes a spherical inertial sensor assembly, at least one position determining device and a processor is provided. The spherical inertial sensor assembly has a surface with a reference pattern. Each position determining device includes a focal plane configured to record images of the reference pattern and star images. The processor is configured to determine the angular position of the spherical inertial sensor assembly via recorded images of the reference pattern and correlate the determined angular position based on the star images.

20 Claims, 12 Drawing Sheets

U.S. PATENT DOCUMENTS

| | | |
|---|---|---|
| 4,671,650 A | 6/1987 | Hirzel et al. |
| 4,711,125 A | 12/1987 | Morrison |
| 4,723,735 A | 2/1988 | Eisenhaure et al. |
| 4,917,330 A | 4/1990 | Dulat et al. |
| 5,067,084 A | 11/1991 | Kau |
| 5,088,825 A | 2/1992 | Derry et al. |
| 5,099,430 A | 3/1992 | Hirsch |
| 5,319,577 A | 6/1994 | Lee |
| 5,357,437 A | 10/1994 | Polvani |
| 5,396,326 A | 3/1995 | Knobbe et al. |
| 5,710,559 A | 1/1998 | Krogmann |
| 5,745,869 A | 4/1998 | Van Bezooijen |
| 5,894,323 A | 4/1999 | Kain et al. |
| 6,172,665 B1 | 1/2001 | Bullister |
| 6,481,672 B1 | 11/2002 | Goodzeit et al. |
| 6,594,623 B1 | 7/2003 | Wang et al. |
| 6,594,911 B2 | 7/2003 | Brunstein et al. |
| 6,629,778 B1 | 10/2003 | Enderle et al. |
| 6,741,209 B2 | 5/2004 | Lee |
| 6,826,478 B2 | 11/2004 | Riewe et al. |
| 7,003,399 B1 | 2/2006 | Chappell |
| 2002/0077189 A1 | 6/2002 | Tuer et al. |
| 2003/0120425 A1 | 6/2003 | Stanley et al. |
| 2004/0015323 A1 | 1/2004 | Boyton |
| 2004/0075737 A1 | 4/2004 | Kirby |
| 2004/0089083 A1 | 5/2004 | Bailey |
| 2004/0098178 A1 | 5/2004 | Brady et al. |
| 2004/0212803 A1 | 10/2004 | Siegl et al. |

FOREIGN PATENT DOCUMENTS

| | | |
|---|---|---|
| GB | 878939 | 10/1961 |
| GB | 1015681 | 1/1966 |
| GB | 1284195 | 8/1972 |
| GB | 2166920 | 5/1986 |
| WO | 9505547 | 2/1995 |
| WO | 2004023150 | 3/2004 |
| WO | 2006060715 | 6/2006 |

OTHER PUBLICATIONS

Benbasat, "An Inertial Measurement Unit for User Interfaces", Sep. 8, 2000, pp. 1-100, Publisher: Massachusetts Institute of Technology, Published in: MA, USA.

El-Sheimy et al., "Structural Monitoring Using Wirelessly Connected Mems-Based Snesors-Towards System Development", Feb. 18, 2003, pp. 1-10, Publisher: ICPCM, Published in: Cairo, Egypt.

IBM Corp., "The Tracking Cube: A Three Dimensional Input Device", Aug. 1, 1989, pp. 91-95, vol. 32, No. 3B, Publisher: IBM Technical Disclosure Bulletin, Published in: NY, US.

Ng, "The Optical Mouse as a Two-Dimensional Displacement Sensor", "Sensors and Actuators A", Oct. 1, 2003, pp. 21-25, vol. 107, No. 1, Publisher: Elseveier Sequoia S.A., Published in: Lausanne, CH.

ABSOLUTE POSITION DETERMINATION OF AN OBJECT USING PATTERN RECOGNITION

CROSS REFERENCE TO RELATED APPLICATIONS

This application is a CIP to U.S. application Ser. No. 11/004,759, filed on Dec. 3, 2004 entitled ABSOLUTE POSITION DETERMINATION OF AN OBJECT USING PATTERN RECOGNITION, which is related to and claims the benefit of the filing date of U.S. Provisional Application No. 60/608,819 filed on Sep. 10, 2004, entitled GENERALIZED INERTIAL MEASUREMENT ERROR REDUCTION THROUGH MULTIPLE AXIS ROTATION DURING FLIGHT, which is incorporated herein by reference.

This application is related to United States patent application Honeywell, U.S. Ser. No. 11/004,184, filed on Dec. 3, 2004 and entitled "GAS SUPPORTED INERTIAL SENSOR SYSTEM AND METHOD" (the '6540 Application). The '6540 Application is incorporated herein by reference.

This application is also related to the following applications filed on Dec. 3, 2004, all of which are hereby incorporated herein by reference:

United States patent application Honeywell, entitled "SPHERICAL POSITION MONITORING SYSTEM," U.S. Ser. No. 11/004,531, filed on Dec. 3, 2004, (the '7169 Application);

United States patent application Honeywell, entitled "PRECISE, NO-CONTACT, POSITION SENSING USING IMAGING," U.S. Ser. No. 11/004,743, filed on Dec. 3, 2004, (the '7057 Application);

United States patent application Honeywell, entitled "THREE DIMENSIONAL BALANCE ASSEMBLY," U.S. Ser. No. 11/004,529, filed on Dec. 3, 2004, (the '7194 Application);

United States patent application Honeywell, entitled "ARTICULATED GAS BEARING SUPPORT PADS," U.S. Ser. No. 11/004,452, filed on Dec. 3, 2004, (the '6475 Application);

United States patent application Honeywell, entitled "GAS JET CONTROL FOR INERTIAL MEASUREMENT UNIT," U.S. Ser. No. 11/004,214, filed on Dec. 3, 2004, (the '6535 Application);

United States patent application Honeywell, entitled "RF WIRELESS COMMUNICATION FOR DEEPLY EMBEDDED AEROSPACE SYSTEMS," U.S. Ser. No. 11/004,177, filed on Dec. 3, 2004, (the '6345 Application); and United States patent application Honeywell, entitled "GENERALIZED INERTIAL MEASUREMENT ERROR REDUCTION THROUGH MULTIPLE AXIS ROTATION DURING FLIGHT," U.S. Ser. No. 11/004,517, filed on Dec. 3, 2004, (the '6368 Application).

BACKGROUND

Precision inertial navigation systems typically require concentric sets of ball bearing supported gimbals which allow instruments to freely rotate in flight maneuvers and allow them to be manipulated for calibration. The embodiments of the previously referenced '6540 Application, which is herein incorporated by reference, eliminate the need for gimbals and ball bearings by supporting the inertial sensor assembly with a spherically shaped gas bearing. The gas bearing allows rotation of the inertial sensor assembly in all axes with no wear due to contact between rotating surfaces. During the flight of a craft, the angular position of the inertial sensor assembly (sometimes also referred to as the attitude, or roll, pitch and yaw of the inertial sensor assembly) relative to the frame of the craft must be monitored at all times. However, because physical contact with the freely rotating, gas bearing supported, inertial sensor assembly is undesirable, the need arises to sense the position of the inertial sensor assembly without physical contact between the sensor and the assembly.

A typical satellite mounted stellar sensor is one example of a contact free angular position sensor. A satellite mounted stellar sensor gives precise attitude information to a satellite flying in space. A star map is first programmed into the memory of the stellar sensor. Then, when the satellite needs its current attitude, it captures an image of a star field and then correlates the pattern of the stars observed to the star map in memory. By identifying the stars observed and determining the relative orientation of star field, the stellar sensor allows the satellite to determine its precise attitude in space. A stellar sensor for a satellite relies on the relative position of observable stars in outer space, which provides a relatively static and reliable source of reference points to correlate against. However, in applications where the surrounding environment is dynamic in nature, the use of external reference points is not feasible, resulting in the need for the current invention.

For the reasons stated above and for other reasons stated below which will become apparent to those skilled in the art upon reading and understanding the specification, there is a need in the art for a means to determine the absolute position of an object using pattern recognition.

SUMMARY

The Embodiments of the present invention address the problem of sensing and measuring the position of an object, where physical contact with the object is undesirable, through using pattern recognition, as well as other problems and will be understood by reading and studying the following specification. The following summary is made by way of example and not by way of limitation. It is provided merely to aid the reader in understanding some of the aspects of the invention. In one embodiment a position determining system is provided. The system includes a spherical inertial sensor assembly, at least one position determining device and a processor. The spherical inertial sensor assembly has a surface with a reference pattern. Each position determining device includes a focal plane configured to record images of the reference pattern and star images. The processor is configured to determine the angular position of the spherical inertial sensor assembly via recorded images of the reference pattern and correlate the determined angular position based on the star images.

DRAWINGS

The present invention can be more easily understood and further advantages and uses thereof more readily apparent, when considered in view of the description of the preferred embodiments and the following figures in which.

In accordance with common practice, the various described features are not drawn to scale but are drawn to emphasize features relevant to the present invention. Reference characters denote like elements throughout Figures and text.

DETAILED DESCRIPTION

In the following detailed description, reference is made to the accompanying drawings that form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense.

As previously discussed, embodiments of the commonly assigned '6540 Application, which is herein incorporated by reference, eliminate the need for gimbals and ball bearings by supporting the inertial sensor assembly with a spherically shaped gas bearing. However, because the gas bearing eliminates physical reference points provided by the gimbals, and because physical contact with the freely rotating inertial sensor assembly is undesirable, the need arises to sense the angular position of the inertial sensor assembly, without physical contact between the sensor and the assembly. Embodiments of the present invention address the problems of contact free position sensing by placing a reference surface pattern on the sphere and using an optical sensor to determine the angular position of the sphere based on an observed portion of the reference pattern.

Figure 1:
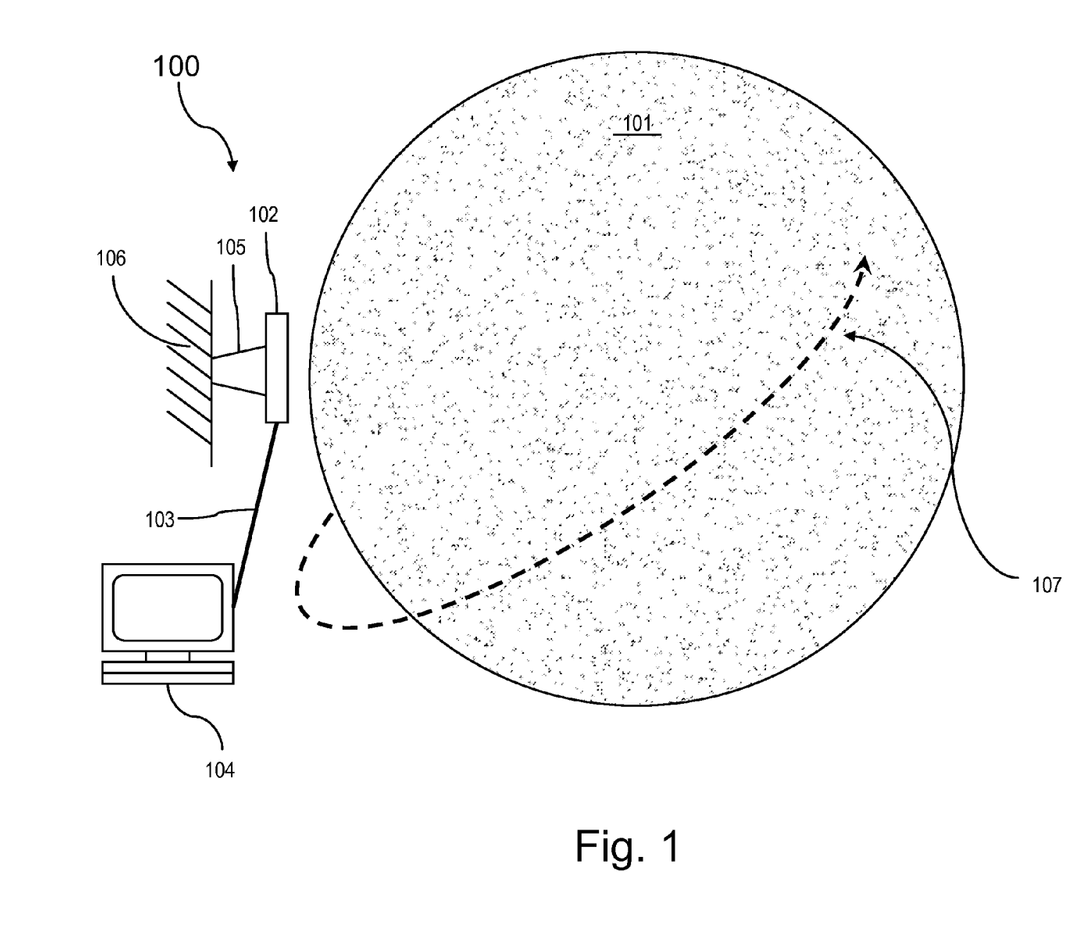
FIG. 1 is a diagram illustrating a position detection system of one embodiment of the present invention.

In FIG. 1, a position detection system 100 of one embodiment of the present invention is illustrated. An optical sensor 102 is aimed at an object having a fixed reference pattern 101, such as a random pattern of dots on a ball, applied to its surface. The output of the optical sensor 102 is coupled with a controller 104 by a communication link 103. The controller 104 is adapted to contain a map of the reference pattern in a memory means. The optical sensor 102 is solidly attached through a mounting bracket 105 to a fixed position 106, while the object 101 is free to rotate. Reference number 107 generally illustrates an example of a rotational motion of the object 101. The optical sensor 102 captures an image of the ball and communicates the image to the controller 104. The controller 104 resolves the pattern of dots by correlating the image against the memorized map of the dot pattern, and calculates the exact position and orientation of the object.

Figure 1B:
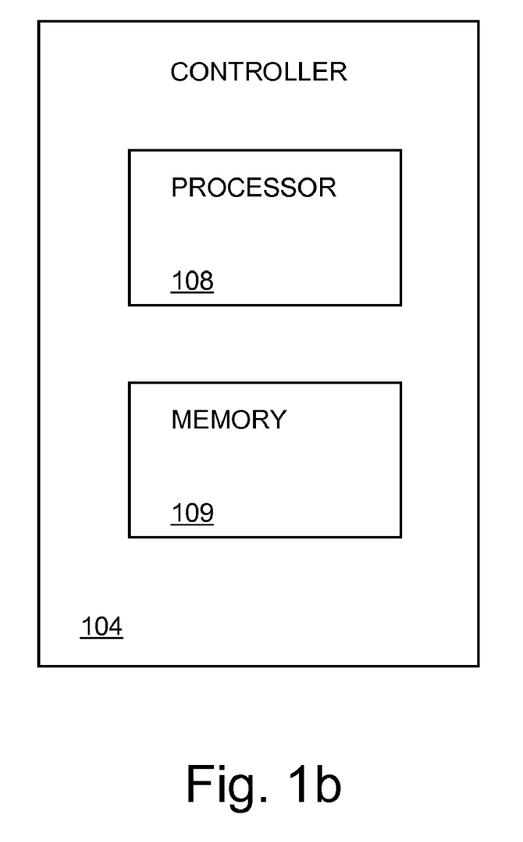
FIG. 1b illustrates a controller of one embodiment of the present invention.

Although the figures in this specification illustrate the use of a computer as a controller, as illustrated in FIG. 1b, any type of controller 104 having a memory 108 to store the pattern map, and a processor 109 that is adapted to match the image taken by an optical sensor with a coordinate on the sphere, and calculate the angular position of the sphere, can be used. Although the present invention was developed to determine the position of a freely moving sphere, the present invention may be used to determine the position of any moving object with a reference pattern.

Figure 2A:
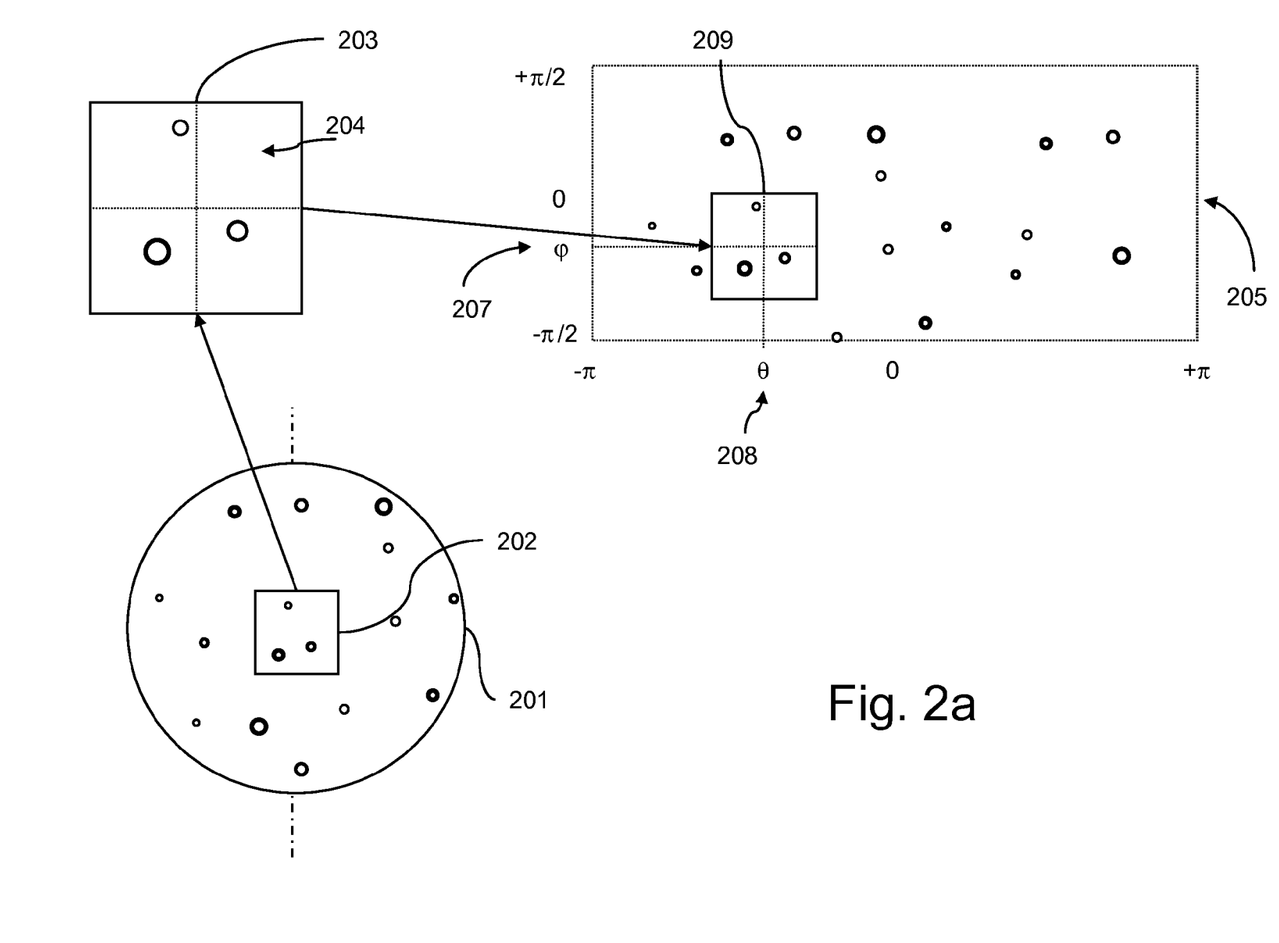
FIGS. 2a and 2b are diagrams illustrating image correlation of one embodiment of the present invention.
Figure 2B:
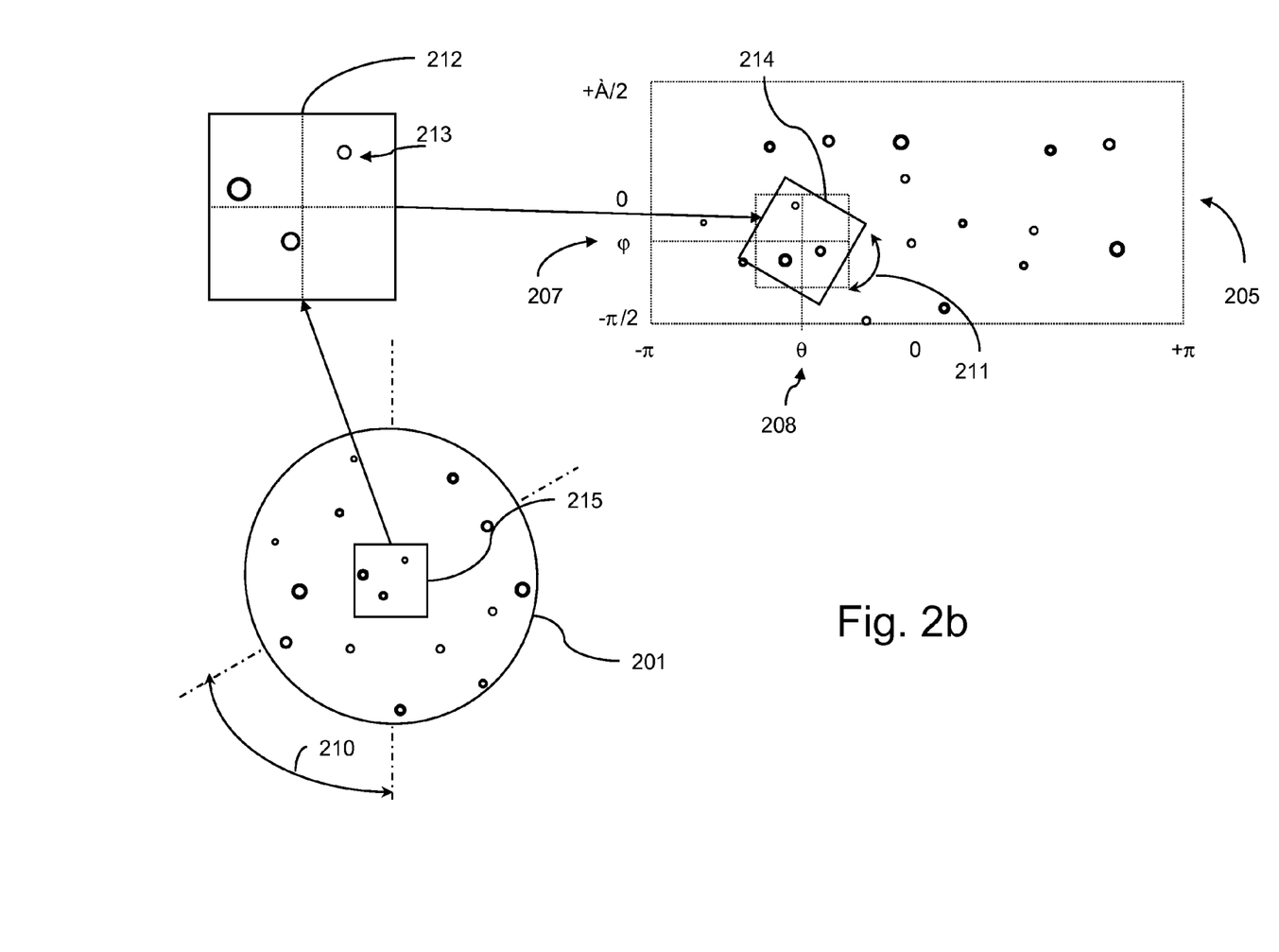
Figure 2C:
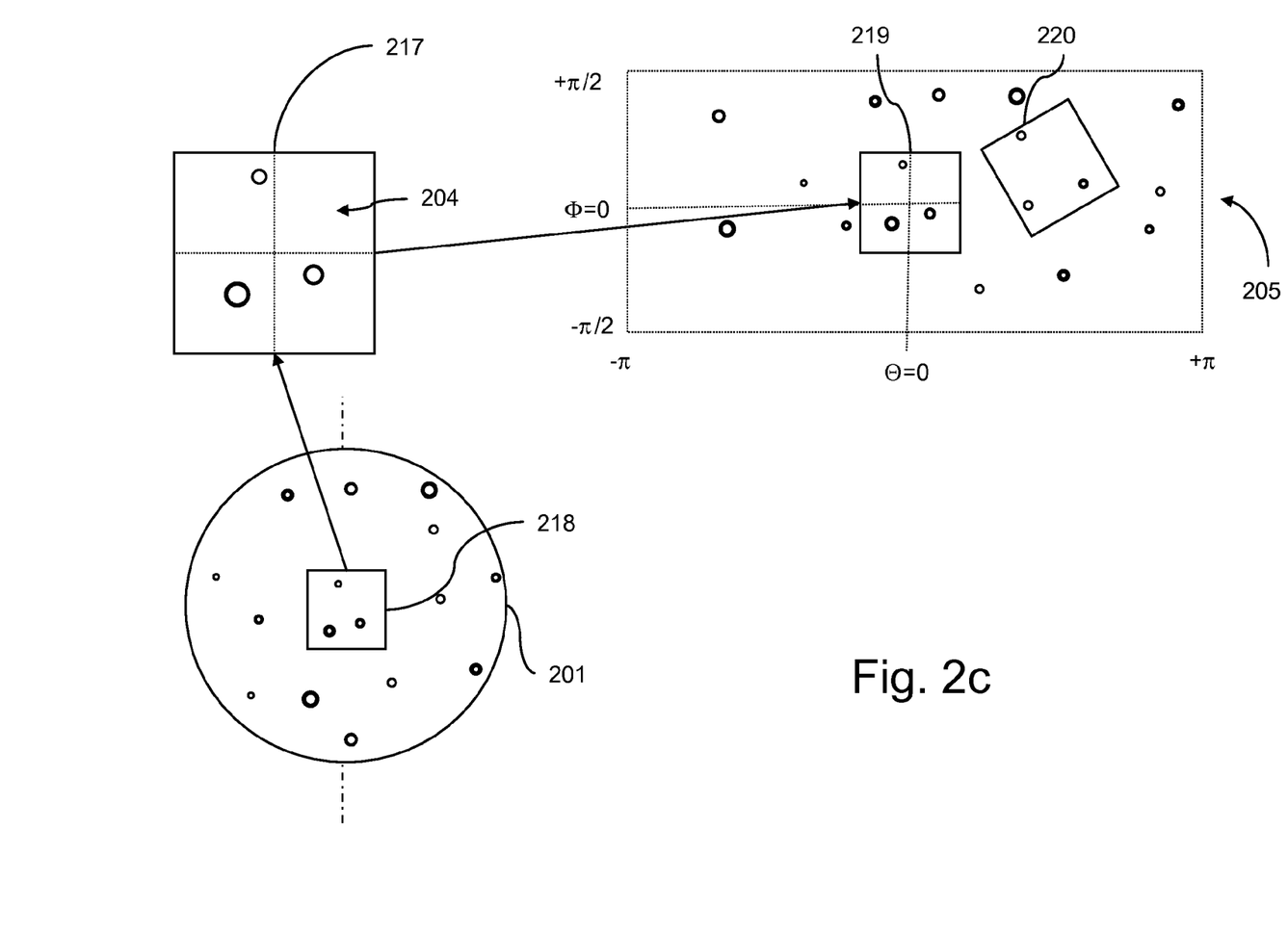

In FIGS. 2a, 2b and 2c, the correlation of an image with a memorized map is illustrated. A map 205 is adapted to correlate specific reference pattern features with physical locations on the sphere 201. To determine the angular position of the sphere, the angular distance between the present location of the pattern features on the sphere and the location of the pattern features when the sphere was in a home (i.e. rest) position must be determined. When the sphere, and the reference pattern features are in the home position, the angular coordinates of yaw, pitch, and roll are defined as zero. As the sphere rotates from the home position, the angular distances between the current location of pattern features and the home location of those features increases. The angular coordinates of yaw, pitch and roll, of the sphere change as a function of the angular distances.

An image 203 captures surface pattern features 204 of an area observed 202 of a sphere 201. On a map of the sphere 205, the correlating pattern features are located 209 and the numerical coordinates of the image 207 and 208 are determined. The numerical coordinates on the map 205 are calibrated to indicate how far the sphere has moved from its home position. By comparing FIG. 2a and FIG. 2b, correlation of a third dimension is illustrated. Another image 212 captures surface pattern features 213 of an area observed 215 on the sphere 201. On the map of the sphere 205, the correlating pattern features are located 214. The coordinates of the image 207 and 208 correlate to the same coordinates as the FIG. 2a example, however an additional third coordinate is produced by the angle of image rotation 211 necessary to match the image features 212 with the map 205. This angle of image rotation 211 is a function of an angular rotation 210 of the sphere 201. The roll pitch and yaw of the sphere is a function of the coordinates 207, 208 and 211, which one skilled in the art will understand how to calculate.

In another embodiment, the home position can be defined by whatever arbitrary initial rotational position the sphere has and the map coordinates recalibrated accordingly. The initial rotational position is defined as the new home position where yaw, pitch and roll are zero. An initial image 217 of the sphere determines the observable area 218 of the sphere 201 when the sphere 201 is in the home position and the associated location 219 of the image 217 on the map 205 is used to recalibrate the map coordinates. If a captured image shows the area 218, then the yaw, pitch and roll are zero. However, if the captured image correlates to another area 220 on the map 205, then the sphere has rotated from its home position and the new angular position of the sphere can be calculated by first determining the coordinates of the image, and angular rotation of the image.

The advantages of using pattern recognition for position detection include: only a single image is required to precisely determine the exact position of the object, it is not necessary for the system to keep track of the object's relative movements over time in order to establish the object's current position, and no physical contact is required between the sensor and the object. In any embodiment of the present invention, the surface reference pattern may be a monochromatic or multicolored random, pseudo random, or pre-defined pattern, as long as the pattern allows the controller to uniquely correlate an image to an absolute position on the object.

Figure 3:
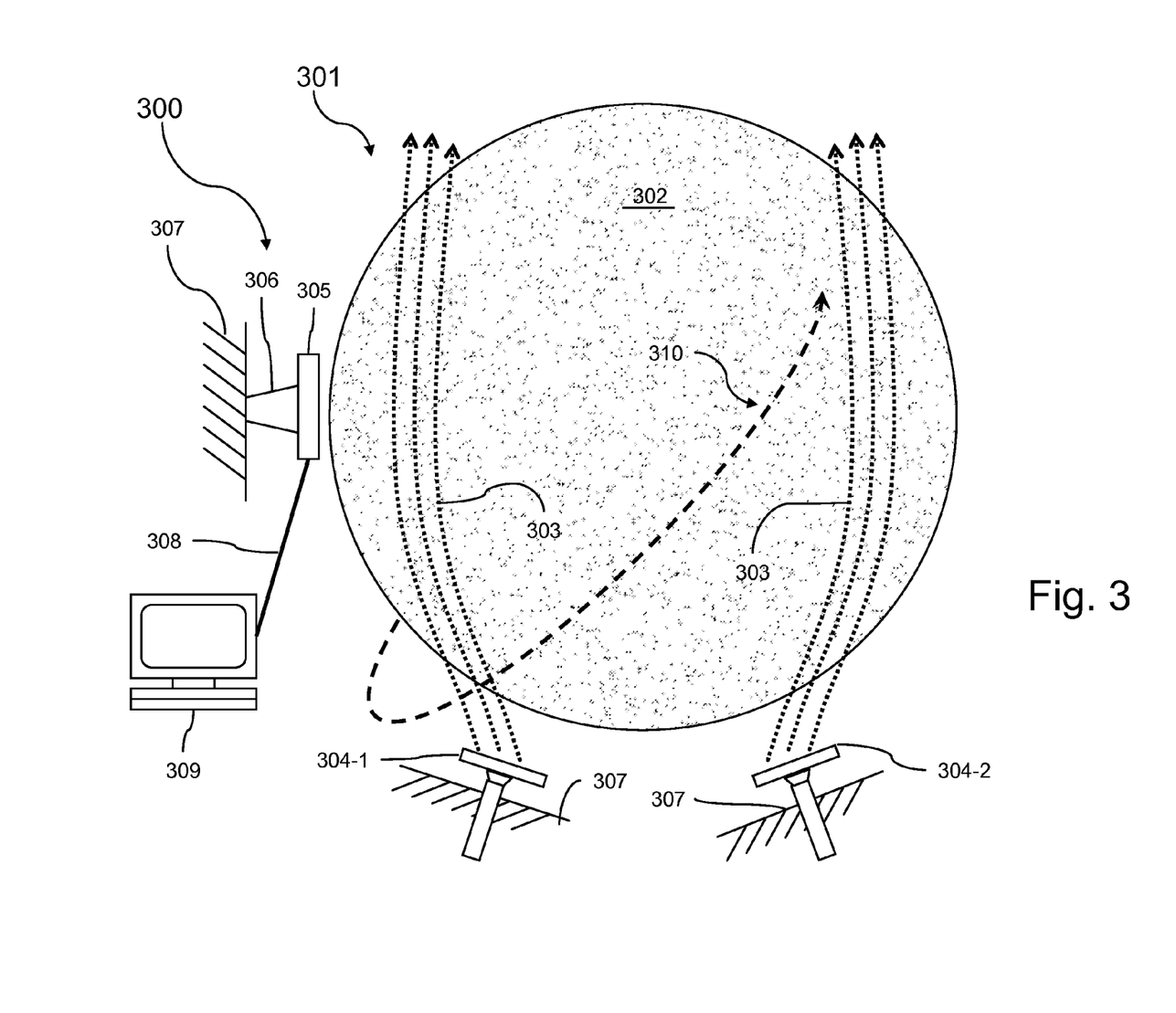
FIG. 3 is a diagram illustrating a position detection system in combination with and gas supported inertial sensor assembly, of one embodiment of the present invention.

In FIG. 3, a position detection system 300, in combination with the Gas Supported Inertial Sensor Assembly 301 of the '6540 Application, of one embodiment of the present invention is illustrated. The gas supported inertial navigation system (INS) 301 utilizes a freely rotating spherically shaped inertial sensor assembly (ISA) 302. The ISA 302 is supported, or floats, within a spherically shaped gas bearing 303 generated by a plurality of gas pads 304-1 and 304-2. (Although only two gas pads are shown in FIG. 2, it will be understood in the art that more than two gas pads can be used to achieve the desired result.) Pressurized gas is applied to the gas pads 304-1 and 304-2 and the supported ISA 302 rides on a cushion of gas with little or no contact between the ISA and the gas pads 304-1 and 304-2. In one embodiment, the gas is air. The frictionless gas bearing 303 (i.e. flow of gas 203) allows the ISA 302 to rotate on all axes. In this embodiment, the optical sensor 305 is secured by a mounting bracket 306 to the outer shell assembly 307 of the INS 301. The ISA 302 is free to rotate within the outer shell assembly 307. Reference number 310 generally illustrates an example of a rotational motion of the ISA 302. Additional details regarding the gas bearing 303, gas pads 304, the INS 301, and the ISA 300 are found in the '6540 Application herein incorporated by reference. The optical sensor 305 is coupled 308 to a controller 309. In this embodiment, the surface of the ISA 302 is covered with a reference pattern, and a map of the reference pattern is programmed into the memory of the controller 309 such that reference pattern's characteristics are correlated with specific coordinates on the ISA's 302 spherical surface. When the position detection system is activated to determine angular position, the optical sensor 305 captures an image of the surface of the ISA 302 and communicates the image to the controller 309. The controller 309 correlates the features of the image to the memorized map thus identifying the specific area of the sphere currently in front of the sensor. Further resolving the rotational angle of the image with the memorized map image, the controller 309 determines the absolute angular position and attitude of the ISA 302.

Figure 4:
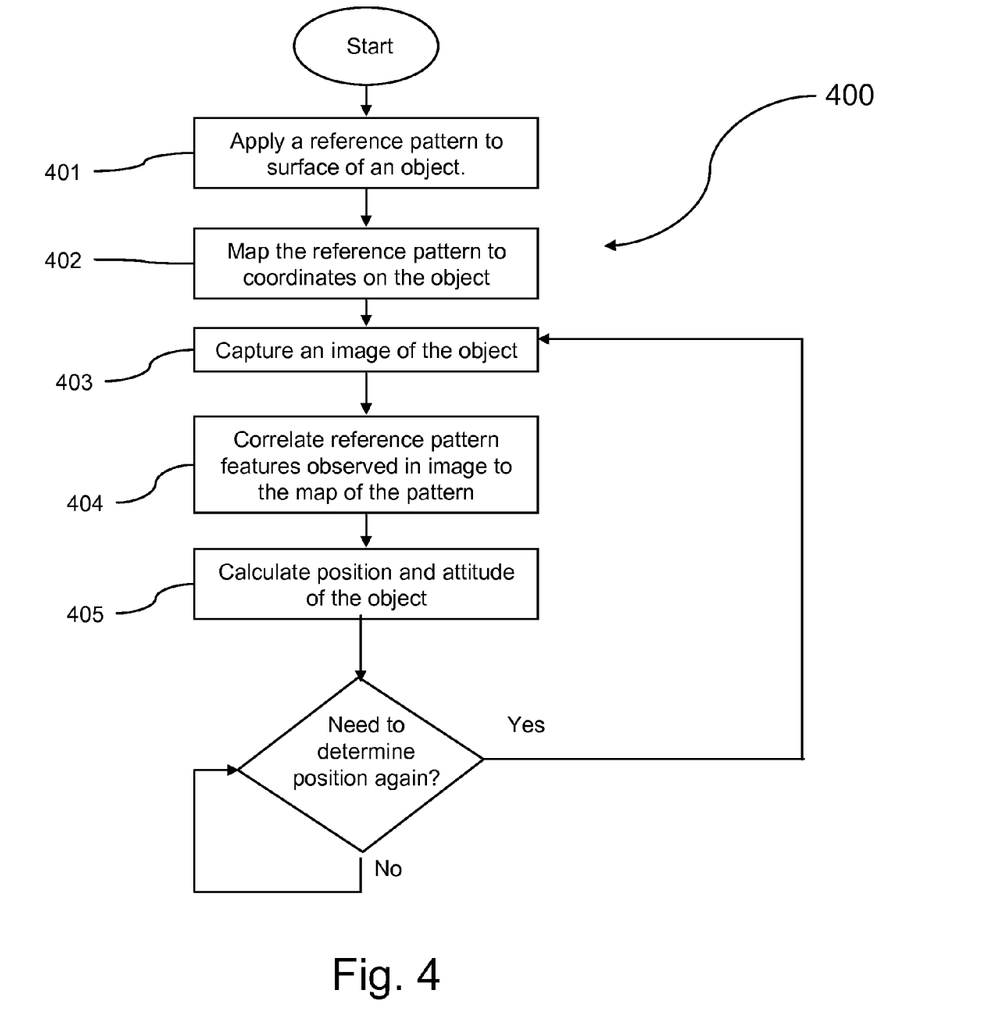
FIG. 4 is a flow chart of a method embodiment of the present invention.

In FIG. 4, a method for precisely determining the angular position of a rotatably movable object 400 of an embodiment of the present invention is illustrated. The method first comprising applying a reference pattern to the surface of the object (401) and mapping the reference pattern to specific coordinates on the object (402). To determine the subsequent angular position of the object at any time, the method further comprising capturing an image of the object which captures the currently observable reference pattern features (403), correlating the reference pattern features and angle of rotation observed in the image to the map of the pattern (404), and calculating the current position and attitude of the movable object (405). To determine the current position of the object at any subsequent time, repeat the method beginning with capturing an image of the object (403).

In other embodiments, the present invention can further determine the angular velocity of a rotating object having a surface reference pattern by calculating the change in angular position over time from a sequence of two or more captured images. The angular position of the object for each image in the sequence is determined by correlating the observable reference pattern features and angle of rotation to a map of the pattern. The resulting sequence of angular positions defines the angular path of rotation. The angular velocity is calculated as a function of the length of the angular path of rotation and the time elapsed between images in the sequence. The time elapsed between capturing each image in the sequence must be sufficiently short in relation to the inertial rotational momentum of the object so the path of rotation between any two sequential images is the shortest possible path.

In another embodiment, the present invention can be combined with the motion detection system of the commonly assigned '7057 Application, herein incorporated by reference. In this embodiment, a sequence of one or more images of a surface reference pattern is processed through a delta detection algorithm to determine the delta-x and delta-y displacement of the images. The angular velocity is calculated as a function of the total displacement indicated by the sequence of images and the time elapsed between images in the sequence.

Several means are available to implement the controller element of the current invention. These means include, but are not limited to, digital computer systems, programmable controllers, or field programmable gate arrays. Therefore other embodiments of the present invention are the program instructions resident on computer readable media which when implemented by such controllers, enable the controllers to implement embodiments of the present invention. Computer readable media include any form of computer memory, including but not limited to magnetic disk or tape, CD-ROMs, DVD-ROMs, or any optical data storage system, flash ROM, non-volatile ROM, or RAM.

Figure 5:
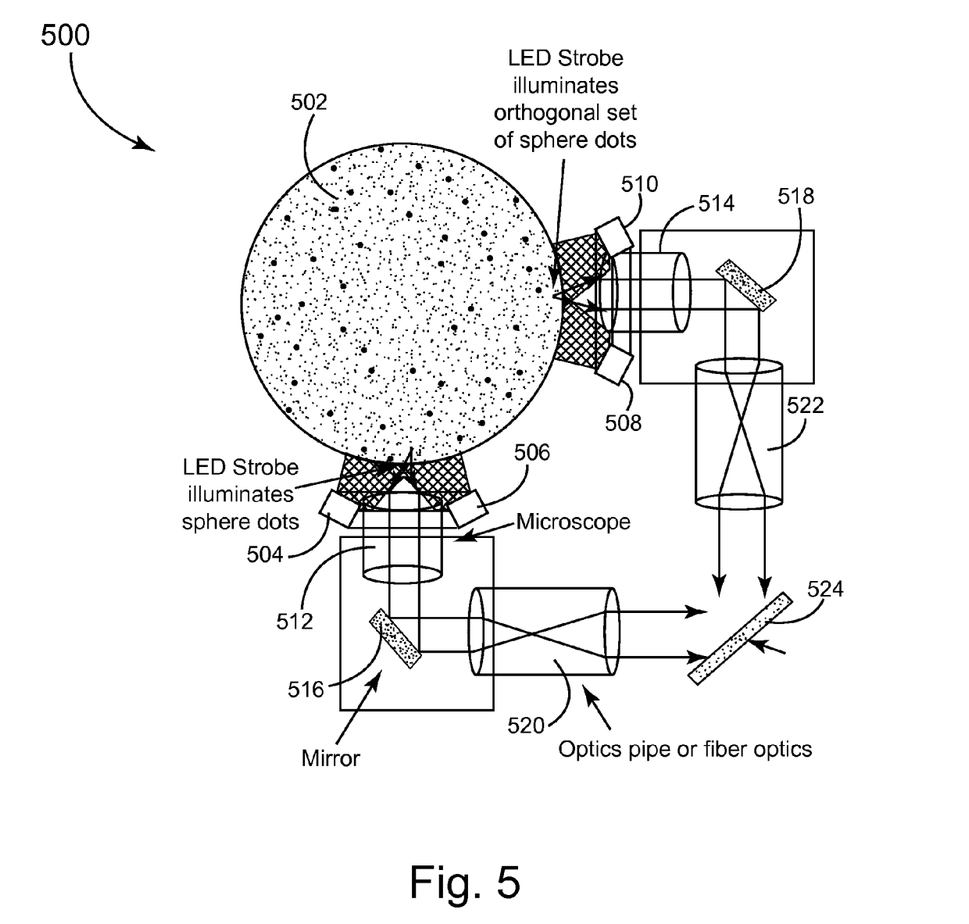
FIG. 5 is an diagram of another embodiment of a position determination system the present invention using two axis tracking on a focal plane.

Referring to FIG. 5 another embodiment of a position determination system 500 of the present invention is illustrated. In this embodiment, two axis tracking is achieved with two different optical paths and one focal plane wherein the focal plane is a sensor (such as optical sensor 102 of FIG. 1) to record images. This embodiment allows alternating or simultaneous imaging of the ball from two angles. Referring to FIG. 5, the system 500 includes a spherical inertial sensor assembly 502. In this embodiment, a first microscope 512 and a second microscope 514 are included. Light Emitting Diodes (LED) strobes 504 and 506 illuminate dots on the sphere 502 for the first microscope 512. Likewise, the second microscope 514 uses LEDs 508 and 510 to illuminate an orthogonal set of dots on the sphere 502. As further illustrated, light is focused with lenses of the microscope 512 to a first mirror 516. The light is then passed to the focal plane 524 of an optical sensor via optics pipe or fiber optics 520. Similarly, light passed from the second orthogonal microscope 514 is focused on a second mirror 518. The light is then reflected through a second optics pipe or fiber optics 522 to the focal plane 524. In one embodiment, alternating imaging by use of the strobes 504, 506, 508 and 510 on the two different surface locations of the sphere is performed. In another embodiment, simultaneous images are used by focusing the two images on different areas of the focal plane 524. In another embodiment, simultaneous images are used where different illumination colors that can be resolved by a color camera are implemented. In embodiments, a controller such as controller 104 of FIG. 1b is used to control the timing of the strobes 504, 506, 508 and 510. Moreover, although LED strobes 504, 506, 508 and 510 are illustrated in FIG. 5 to illuminate the respective areas of the sphere 502, it is contemplated that other types of controllable illumination sources could be used and that the present invention is not limited to LED strobes.

Figure 6:
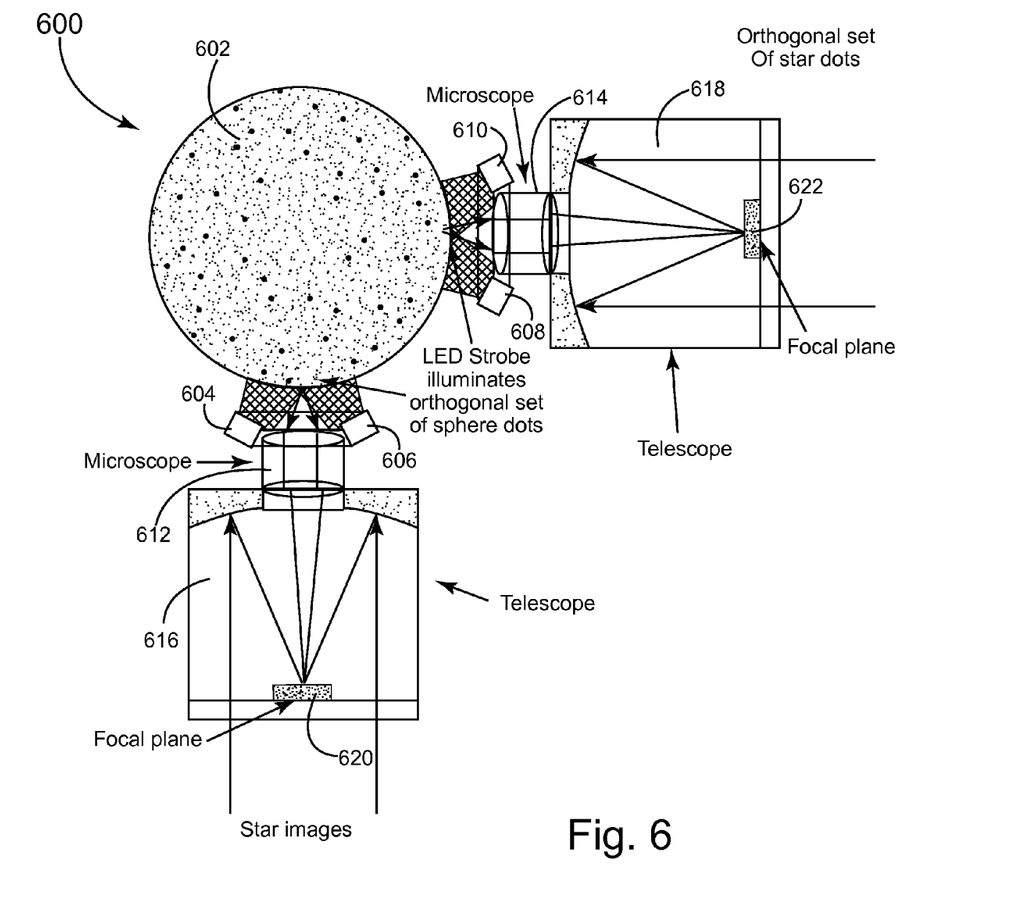
FIG. 6 is an diagram of an embodiment of the present invention using stellar alignment.
Figure 7:
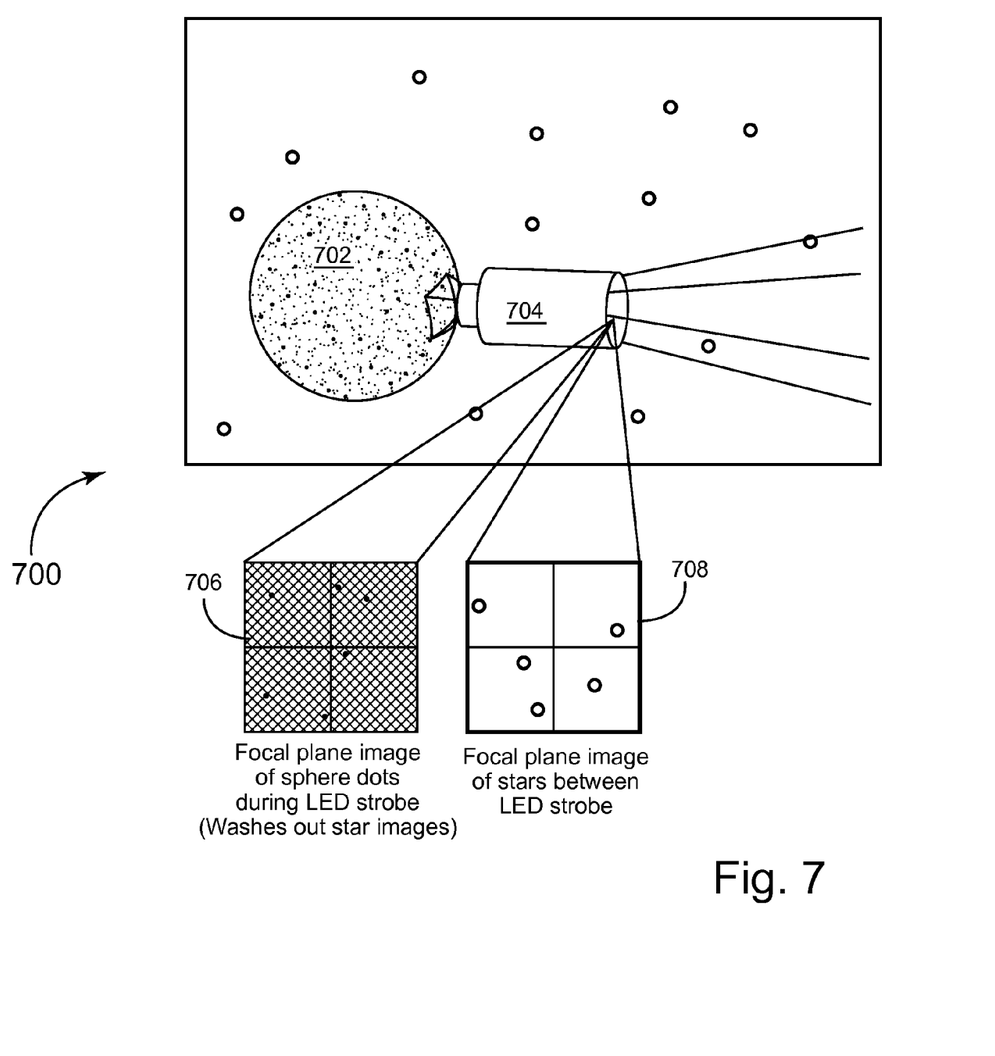
FIG. 7 is an illustration of recorded images of a positioning determining device of one embodiment of the present invention.

FIG. 6 illustrates another position determination system 600 that includes stellar alignment of one embodiment. As illustrated a first telescope 616 and first microscope 612 and a second telescope 618 and second microscope 614 allows for 2 axis tracking of the spherical inertial sensor assembly 602. LED strobes 604 and 606 provide illumination of select areas of the sphere 602, for the first microscope 612. The reflected light from the sphere 602 is passed through the first telescope 616 and focused by lenses in the telescope 616 on a first focal plane 620. As in the embodiments above, the focal plane 620 is an image sensor 620. As also illustrated, star images enter the telescope 616 and are reflected off mirrors 615 and 617 to the respective focal plane 620. Similarly, the reflected light from the sphere 602 is passed through the second telescope 618 and focused by lenses in the telescope 618 on a second focal plane 620. As also illustrated, star images enter the telescope 618 and are reflected off mirrors 619 and 621 to the respective focal plane 622. Although, FIG. 6 illustrates two different telescopes 616 and 618, for two axis tracking with co-linear optics, in another embodiment only one telescope 616 is used with one focal plane 620 or camera 620. Referring to FIG. 7, an illustration of images recorded by a focal plane or camera is illustrated in relation to a position determining system such as focal plane 620 of position determining system 600 of FIG. 6. FIG. 7 illustrates position determining system 700 which includes spherical inertial sensor assembly 702 and positioning determining device 704. In one embodiment the positioning determining device 710 is similar to LED strobes 604 and 606, microscope 612, telescope 616 and focal plane 620 of FIG. 6. Examples of the recorded images of the position determining device 704 are illustrated in FIG. 7. In particular, image 706 illustrates a focal plane image of sphere dots during LED strobes and image 708 illustrates focal plane images of stars between LED strobes. In use, a controller, such as controller 104 of FIG. 2, compares the focal plane image of sphere dots 706 with stored images of the dots in the memory 109 to determine the angular position (attitude) of the sphere 702. The controller 104 further compares the focal image of the recorded stars with stored images of stars to determine the absolute attitude of the sphere 702. The controller 104 then correlates the attitude of the sphere 702 to the absolute attitude given by the stars. Hence, this embodiment provides a stellar update of the position determining device 700.

Figure 8:
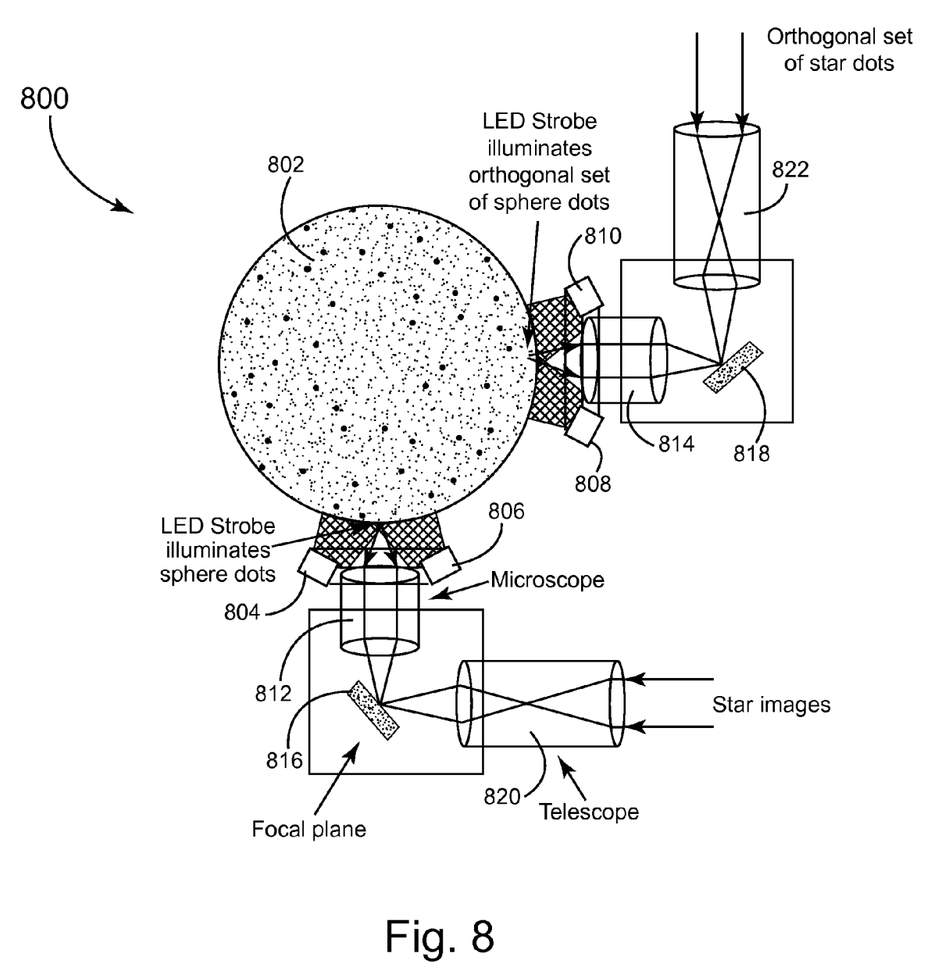
FIG. 8 is an diagram of another embodiment of the present invention using stellar alignment.
Figure 9:
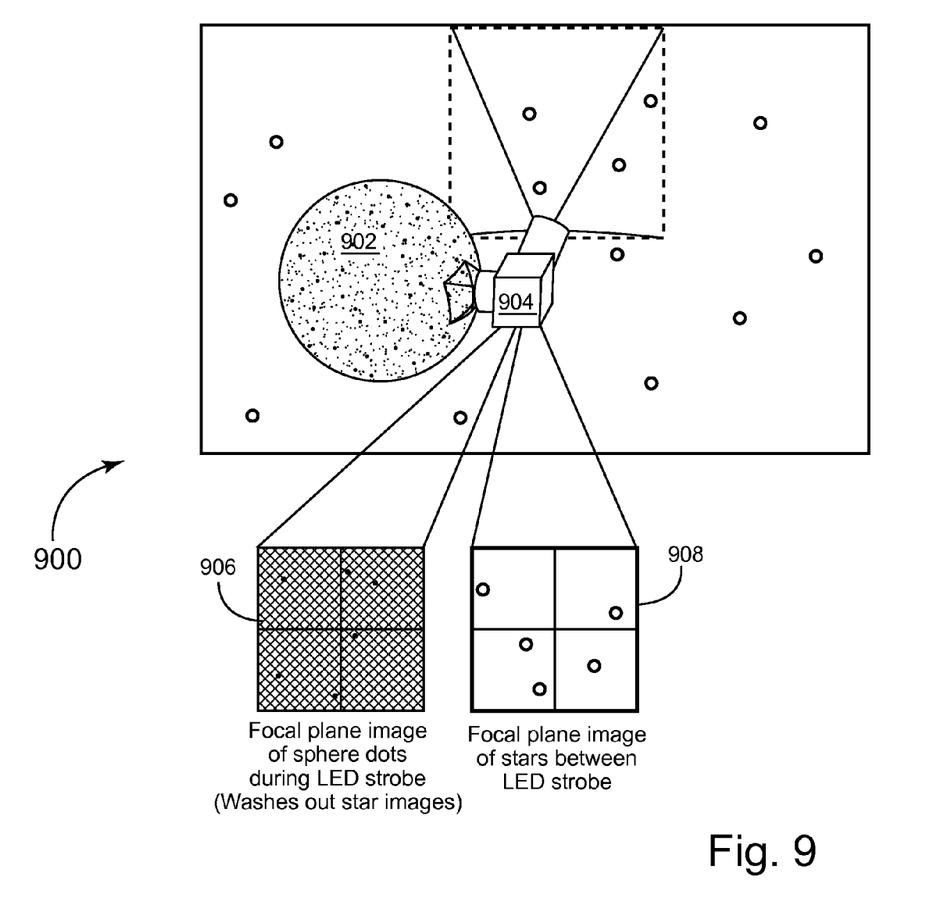
FIG. 9 is an illustration of recorded images of another position determining device of one embodiment of the present invention.

Another embodiment of a position determination system 800 is illustrated in FIG. 8. In this example, orthogonal optic on a common focal plane is used. FIG. 8 illustrates the use of two determination devices. The first determination device includes LED strobes 804 and 806, microscope 812, focal plane 816 and telescope 820. The second determination device includes LED strobes 804 and 806, microscope 814, focal plane 818 and telescope 822. As illustrated in FIG. 8, LED strobes 804 and 806 illuminate sphere dots in a select area on the sphere 802. Lenses in the microscope 812 focus the dot images on the focal plane 816. Meanwhile telescope 820 focuses star images also on focal plane 816. In regards to the second determination device, the LED strobes 808 and 810 illuminates orthogonal set of sphere dots in a different select area. Lenses in the microscope 814 focus the dot images on focal plane 818. Meanwhile telescope 822 focuses star images also on focal plane 818. Although, FIG. 8 illustrates two determination devices, for 2 axis tracking plus stellar update, in other embodiments only a single determination device is used. In one embodiment, the differential locations of the dot and star images on the focal plane are used. In another embodiment, alternating illumination to image two areas of the sphere 802 on one focal plane and image stars when both illumination sources are off is used. Examples of the recorded images of a position determining device 904 that is similar to the deterring devices of FIG. 8 is illustrated in FIG. 9. In particular, image 906 illustrates a focal plane image of sphere dots during LED strobes and image 908 illustrates focal plane images of stars between LED strobes. In use, a controller, such as controller 104 of FIG. 2, compares the focal plane image of sphere dots 906 with stored images of the dots in the memory 109 to determine the angular position (attitude) of the sphere 902. The controller 104 further compares the focal image of the recorded stars with stored images of stars to determine the absolute attitude of the sphere 902. The controller 104 can then correlates the attitude of the sphere 902 to the absolute attitude given by the stars. Hence, this embodiment also provides a stellar update of the position determining device 900.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

What is claimed is:

1. An angular position detection system for an object having a reference surface pattern, the angular position detection system comprising:
    at least one optical sensor configured to generate image signals of a reference surface pattern on a spherical inertial sensor assembly, the at least one optical sensor further configured to generate image signals of stars;
    a memory having maps of the reference surface pattern and of the stars stored therein; and
    a processor configured to determine the surface location of the object by comparing an image signal of the reference surface pattern from the at least one optical sensor with the map of the surface pattern in the memory, the processor further adapted to determine the attitude of the object based on a matched image signal of reference surface pattern and the stored reference pattern map, the processor further configured to determine absolute attitude of the assembly based on a comparison of star images and the stored star map and correlate the attitude of the assembly with the determine absolute attitude.

2. The angular position detection system of claim 1, further comprising:
    light emitting diode (LED) strobes configured to illuminate a section of the reference surface pattern, wherein the at least one sensor generates the image signals based on reflected light signals generated by the LED strobes.

3. The angular position detection system of claim 2, further comprising:
    a microscope for each optical sensor, each microscope configured to direct the reflected light signals to its associated optical sensor.

4. The angular position detection system of claim 3, further comprising:
    a telescope for each optical sensor, each telescope configured to direct star images to the its associated optical sensor.

5. The angular position detection system of claim 4, wherein the optical path provided by each telescope and microscope associated with an optical sensor is co-linear.

6. The angular position detection system of claim 4, wherein the optical path provided by each telescope and microscope associated with an optical sensor is orthogonal.

7. The angular position detection system of claim 1, wherein the map includes coordinates for reference surface pattern features.

8. The angular position detection system of claim 1, wherein the reference surface pattern is one of a random pattern, a pseudo-random pattern, a pre-defined pattern, a multicolored pattern, a monochromatic pattern and dots.

9. The angular position detection system of claim 1, wherein the processor is further adapted to determine the angular velocity of the object by calculating the change in angular position over time from a sequence of two or more of the image signals.

10. The angular position detection system of claim 1, wherein the processor is further adapted to apply a delta detection algorithm to a series of two or more of the image signals to determine the distance and direction the object has moved, the controller still further adapted to calculate the angular velocity of the object's movement based on a time sequence between the received series of image signals and the distance moved.

11. A position determining system, the system comprising:
a spherical inertial sensor assembly having a surface with a reference pattern;
at least one position determining device, each position determining device including a focal plane configured to record images of the reference pattern and star images; and
a processor configured to determine the angular position of the spherical inertial sensor assembly via recorded images of the reference pattern and correlate the determined angular position based on the star images.

12. The system of claim 11, wherein each position determining device further comprising:
controllable illumination sources configured to illuminate a section of the reference surface pattern to generate reflected images of the reference pattern.

13. The system of claim 11, wherein each position determining device further comprising:
a controller configured to control the controllable illumination sources.

14. The system of claim 12, wherein each position determining device further comprising:
a microscope configured to direct the reflected images to the focal plane; and
a telescope configured to direct star images to the focal plane.

15. The angular position detection system of claim 14, wherein an optical path provided by the telescope and microscope are one of co-linear and orthogonal.

16. A position determining system, the system comprising:
a spherical inertial sensor assembly having a surface with a reference pattern;
a first optical path configured to pass reflect images of the reference pattern from a first select area;
a second optical path configured to pass reflected images of the reference pattern from a second select area;
at least one focal plane to record the reflected images from the first and the second optical paths; and
a processor configured to determine the angular position of the spherical inertial sensor assembly via the recorded images of the reference pattern.

17. The system of claim 16, wherein each of the first and second optical paths further comprise:
controllable illumination sources configured to illuminate the select reference pattern area to generate the reflected images.

18. The system of claim 17, wherein each of the first and second optical paths further comprise:
a microscope to direct the reflected images to a mirror; and
one of an optics pipe and fiber optics to pass the reflected images from the mirror to the focal plane.

19. The system of claim 17 further comprising:
a controller configured to control a timing of the controllable illumination sources.

20. The system of claim 17, wherein the first and second optical paths are configured to direct the respective images to different locations on the focal plane.

* * * * *